United States Patent
Kossel et al.

(10) Patent No.: US 8,428,110 B2
(45) Date of Patent: Apr. 23, 2013

(54) PIPELINING AND SUB-RATE OPERATION FOR MEMORY LINKS

(75) Inventors: Marcel A. Kossel, Reichenburg (CH); Thomas H. Toifl, Rueschlikon (CH)

(73) Assignee: International Business Machines Corporation, Armonk, NY (US)

( * ) Notice: Subject to any disclaimer, the term of this patent is extended or adjusted under 35 U.S.C. 154(b) by 98 days.

(21) Appl. No.: 13/072,008

(22) Filed: Mar. 25, 2011

(65) Prior Publication Data

US 2012/0243599 A1    Sep. 27, 2012

(51) Int. Cl.
*H03H 7/30*    (2006.01)
*H03H 7/40*    (2006.01)
*H03K 5/159*   (2006.01)

(52) U.S. Cl.
USPC .......... 375/229; 375/232; 375/233; 375/346; 398/193

(58) Field of Classification Search .......... 375/229–236, 375/296, 346–350; 398/192–193
See application file for complete search history.

(56) References Cited

U.S. PATENT DOCUMENTS

| | | | |
|---|---|---|---|
| 7,693,233 B2 | 4/2010 | Gu et al. | |
| 7,769,099 B2 | 8/2010 | Parhi et al. | |
| 2002/0080883 A1* | 6/2002 | Tamura et al. | 375/257 |
| 2005/0289204 A1* | 12/2005 | Tellado et al. | 708/300 |

OTHER PUBLICATIONS

Yongru Gu et al, "Pipelining Tomlinson-Harashima Precoders," downloaded on Jun. 6, 2010 from IEEE Xplore, Copyright 2005 IEEE.

* cited by examiner

*Primary Examiner* — Curtis Odom
(74) *Attorney, Agent, or Firm* — Cantor Colburn LLP; Daniel Morris

(57) ABSTRACT

A system includes a memory hub chip including a Tomlinson-Harashima precoding (THP) equalizer portion operative to perform transmitter equalization at the memory hub chip and send data from to a memory chip.

8 Claims, 19 Drawing Sheets

PIPELINING AND SUB-RATE OPERATION FOR MEMORY LINKS

BACKGROUND

Memory links are multi-drop buses that are operated either between a memory controller and a memory chip or directly between the processor and a memory chip. The memory is typically composed of a set of dual inline memory modules (DIMMs) that each has one or more ranks of memory. Because of the T-junctions and the different impedance levels required to operate the multi-drop bus, memory channels typically have a long pulse response with many reflections. These non-idealities either limit the maximum data rate or call for sophisticated equalization schemes.

BRIEF SUMMARY

According to one embodiment of the present invention, a system includes a memory hub chip including a Tomlinson-Harashima precoding (THP) equalizer portion operative to perform transmitter equalization at the memory hub chip and send data from to a memory chip.

According to another embodiment of the present invention a method for sending data to a memory chip includes receiving data at a data transmitter disposed on a memory hub chip, applying THP equalization to the data prior to transmitting the data, transmitting the data from the transmitter to a memory chip.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
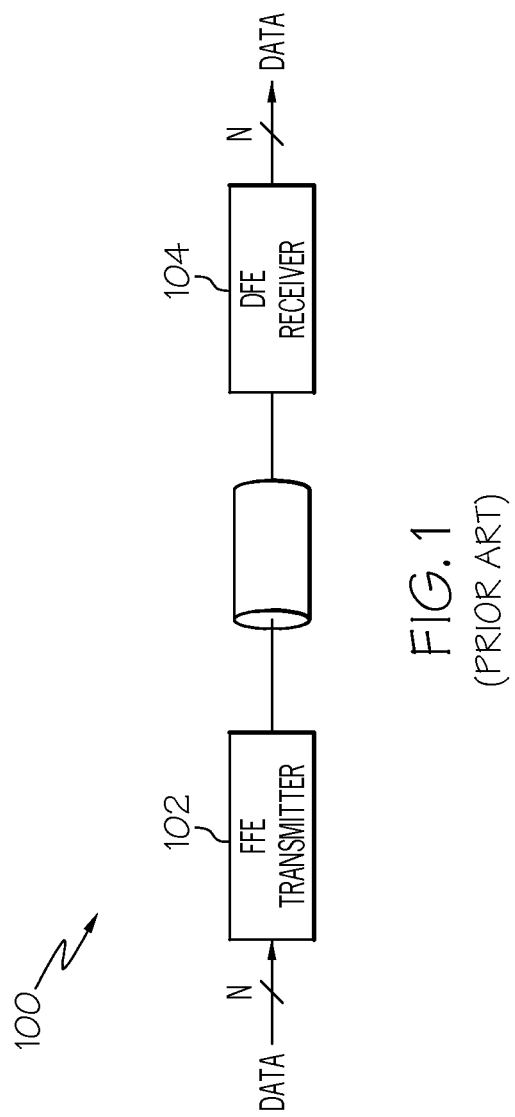
FIG. 1 illustrates a block diagram of a prior art example of a memory link arrangement.

FIG. 1 illustrates a prior art example of a memory link arrangement 100. In this regard, serial link feed-forward equalization (FFE) is used in the transmitter 102 to reduce pre-cursor intersymbol interference (ISI) whereas decision-feedback equalization (DFE) is used in the receiver 104 for the elimination of post-cursor ISI.

Figure 2:
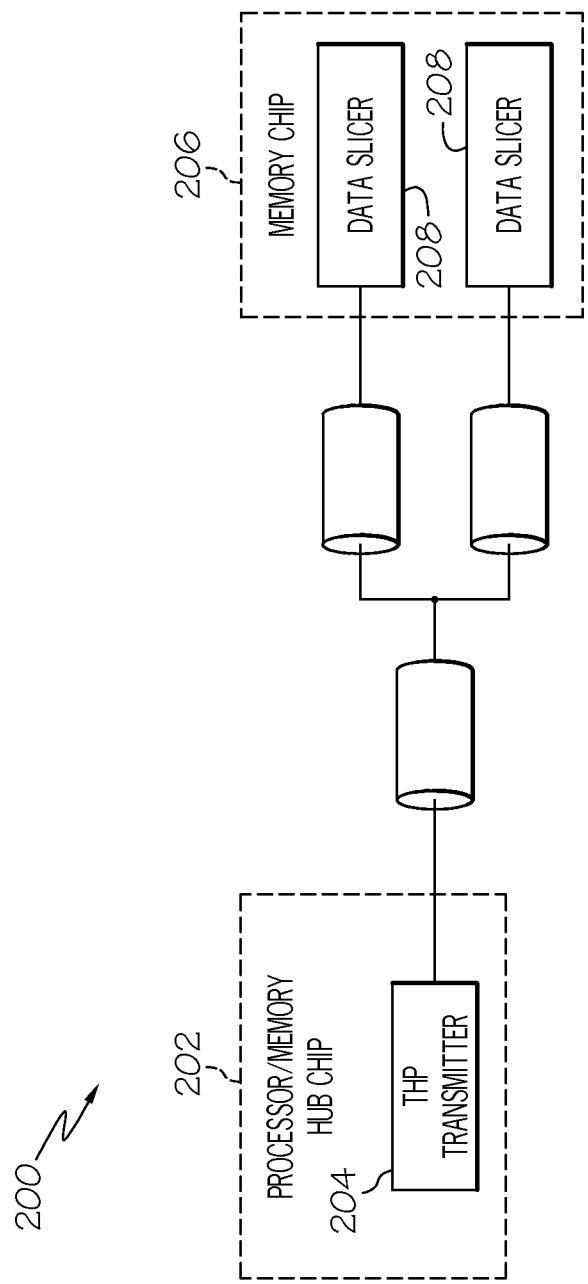
FIG. 2 illustrates a block diagram of an exemplary embodiment of a memory link arrangement.

FIG. 2 illustrates an exemplary embodiment of a memory link arrangement 200. The arrangement 200 includes a processor/memory hub chip 202 that includes a Tomlinson-Harashima precoding (THP) transmitter portion 204 that is communicatively connected to a memory chip portion 206 that may include, for example, DIMMs. Data slicer portions 208 of the memory chip portion 206 are communicatively connected to the THP transmitter portion 204. The arrangement 200 facilitates post-cursor equalization to be performed on the processor 202 as opposed to the memory chip 206. An advantage of the arrangement 200 is that post-cursor equalization may be performed by the processor 202 without using DFEs on the memory chip 206. Such an arrangement allows the memory link data rate to be determined by the processor 202.

Tomlinson-Harashima precoding (THP) includes an infinite-response filter (IIR) with a bounded signal space by means of a modulo-operation applied to the feedback signal in the IIR filter. Pipelining the THP solves the data rate limitation caused by the delay in the feedback path and the sub-rate operation to relax the timing requirements. The calculation of the post-cursor ISI subtraction in the IIR filter is performed within one bit period. If operated in sub-rate mode, the period of time available for this calculation increases according to the sub-rate factor.

Figure 3:
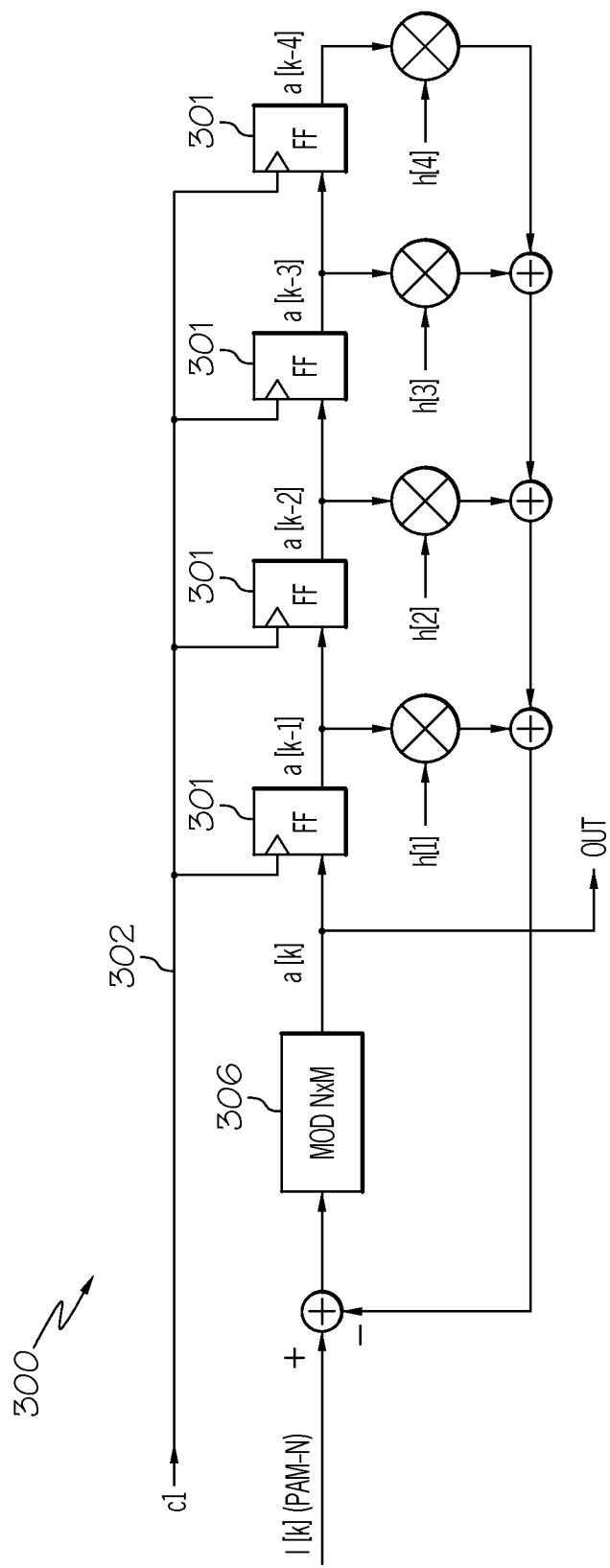
FIG. 3 illustrates a block diagram of an exemplary embodiment of a full-rate 4-tap Tomlinson-Harashima precoder.

In this regard, FIG. 3 illustrates an exemplary block diagram of a full-rate 4-tap Tomlinson-Harashima precoder 300. A tap is defined as the value (denoted by h[1]-h[4] in 300) of one of two factors applied to the multipliers shown in 300.

The other factor is one of the outputs of the delay line (denoted by a[k] through a[k−4] in 300). The multipliers and adders implement the convolution between the data and the taps, which are chosen such that the post-cursor ISI gets cancelled while the data is being transmitted over the (memory) channel so that the data eye at the receiver input is open and can be sampled without further processing (i.e., no continuous-time linear equalizer or decision feedback equalizer will be required in the receiver). The precoder 300 includes a flip-flop delay line 302 connected to flip-flops 301 operated at the full-rate clock c1. The outputs of the delay line 302 (a[k−1] through a[k−4]) are multiplied by the taps h<1: 4>, which correspond to the first four post-cursor tap weights of the memory channel. The products of the tap multiplications are summed to build the post-cursor ISI that is subtracted from the data symbol I[k]. The result of the subtraction is passed through a modulo-operator 306 to limit the amplitude of the transmit signal. If the spacing between two adjacent signal points is defined as M in a pulse-amplitude (PAM) signal with N levels, the argument of the modulo-operator is N×M. The THP operation according to the illustration of FIG. 3 may be described as:

Time-Domain:

$$a[k] = I[k] - \left(\sum_{j=1}^{L} h_j a[k-j]\right) + b[k]NM \qquad (1)$$

Z-Domain:

$$A(z) = I(z) - (H(z)-1)A(z) + NMB(z) \qquad (2)$$

where I[k] are the data symbols, a[k] are the transmit symbols, $h_j$ are the channel coefficients or taps, M is the symbol spacing, N is the number of signal points and b[k] represents the appropriate integer that brings a[k] to the desired amplitude range. The sum within the parenthesis in equation (1) corresponds to the post-cursor ISI that is subtracted from the data signal.

The implementation of the block diagram in FIG. 3 has drawbacks. For example, the delay in the feedback path; namely the delay associated to the calculation of $$\sum_{j=1}^{L} h_j a[k-j].$$

The feedback delay increases with the number L of taps according to $T_m + T_a L/2$ where $T_m$ denotes the multiplier delay and $T_a$ is the delay of a single adder. This calculation assumes that the additions are performed with an adder tree in 2's complement format. The MOD-operation is inherently obtained by truncation of the sum. To reduce the feedback delay and hence increase the data rate, pipelining can be applied, which makes the feedback delay independent of the number of taps as will be shown below together with an exemplary embodiment of the pipeline architecture.

Figure 4:
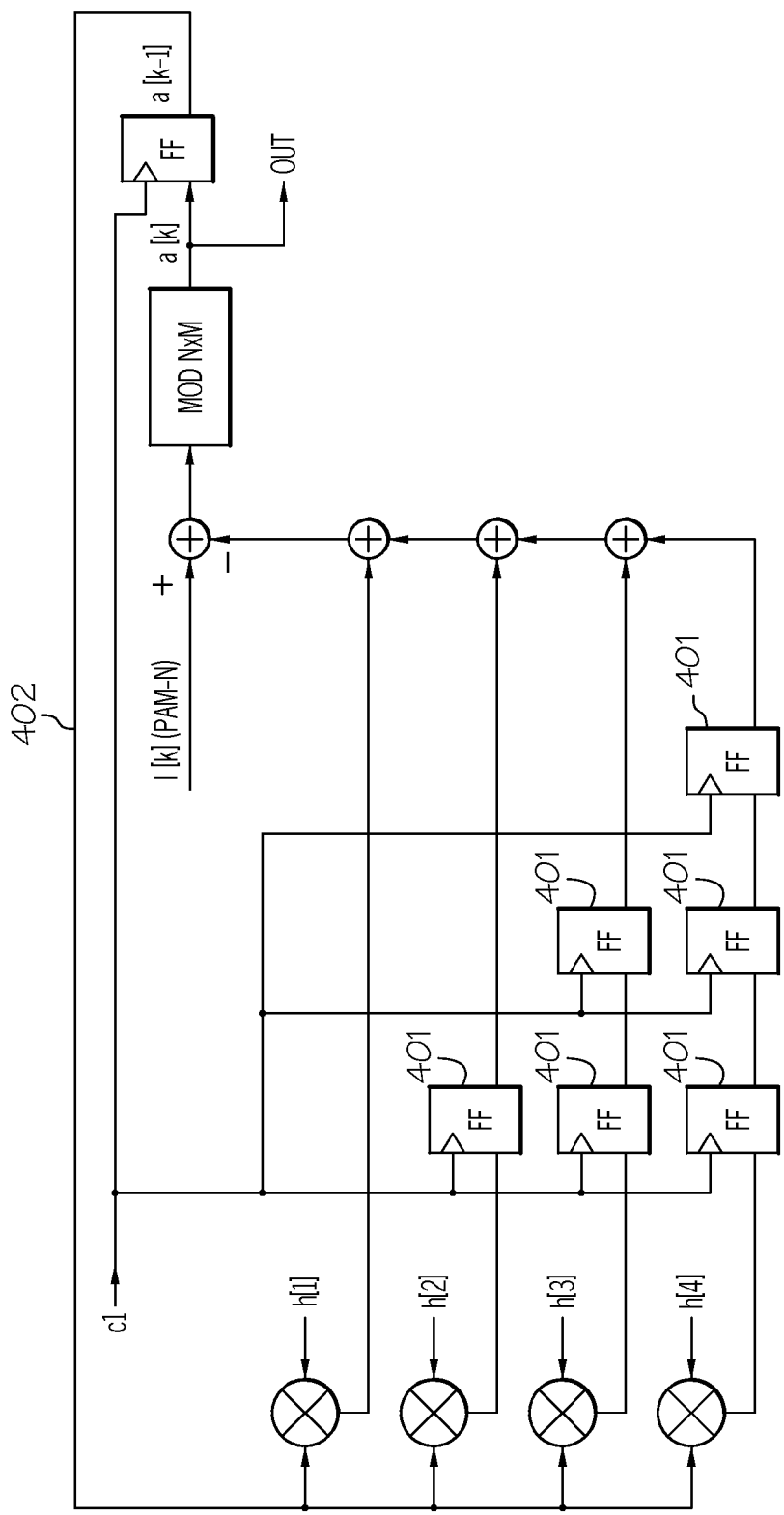
FIG. 4 illustrates a block diagram of an exemplary embodiment of a portion of the pipelining in which the delay lines are moved from the inputs of the multipliers to their outputs.

The pipelining will be described according to the intermediate steps shown in FIG. 4 through FIG. 6. A first portion of the pipelining is depicted in FIG. 4, which illustrates a method for performing all multiplications for a certain value of a[k] at the same time. In the conventional scheme the multiplications of a[k−j] with the tap weights $h_j$ are performed sequentially according to the propagation of a[k] through a delay line 402. Since a[k] does not change during the propagation through the chain of flip flops 401, the individual products $h_1 a[k-1]$ through $h_n a[k-n]$ are pre-computed. In order to sum the right products (namely those belonging to time step k), the products are delayed according to their position within the tap weight vector. For instance, $h_4 a[k-1]$ is delayed by three flip flops 401 whereas $h_2 a[k-2]$ is delayed by one flip flop 301.

Figure 5:
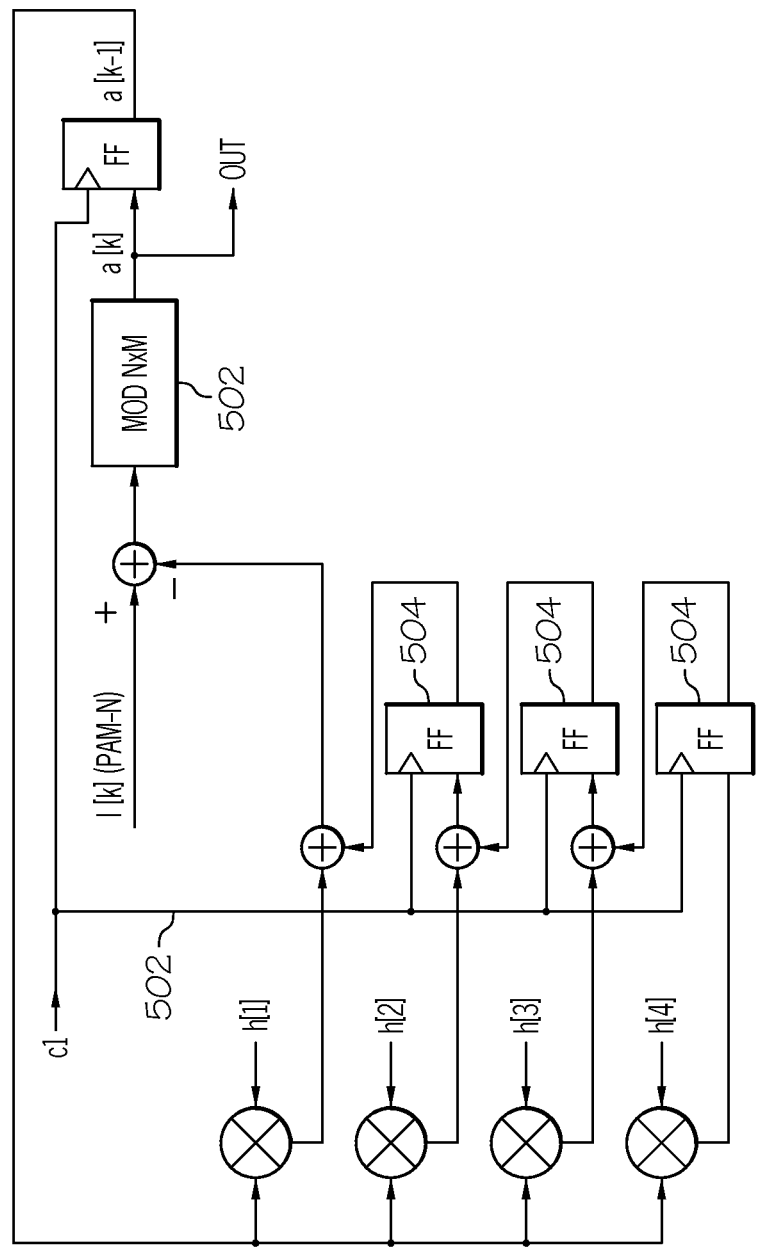
FIG. 5 illustrates a block diagram of an exemplary embodiment of another portion of the pipelining in which the delay line padding is removed.

The flip flop 401 chains of FIG. 4 used to appropriately add the individual products $h_j a[k-1]$ can be eliminated by sequentially adding the partial sums as shown in FIG. 5. Referring to FIG. 5, a flip-flop delay line 502 is connected to flip-flops 504. In each clock cycle the product between a[k−1] and $h_j$ is added to the sum of the previously calculated partial sums belonging to products with an index higher than j. The pipelining of the adders can be expressed as $ps_j = h_j a[k-j] + ps_{j+1}$, where $ps_j$ denotes the partial sum calculated after the multiplication with $h_j$.

Figure 6:
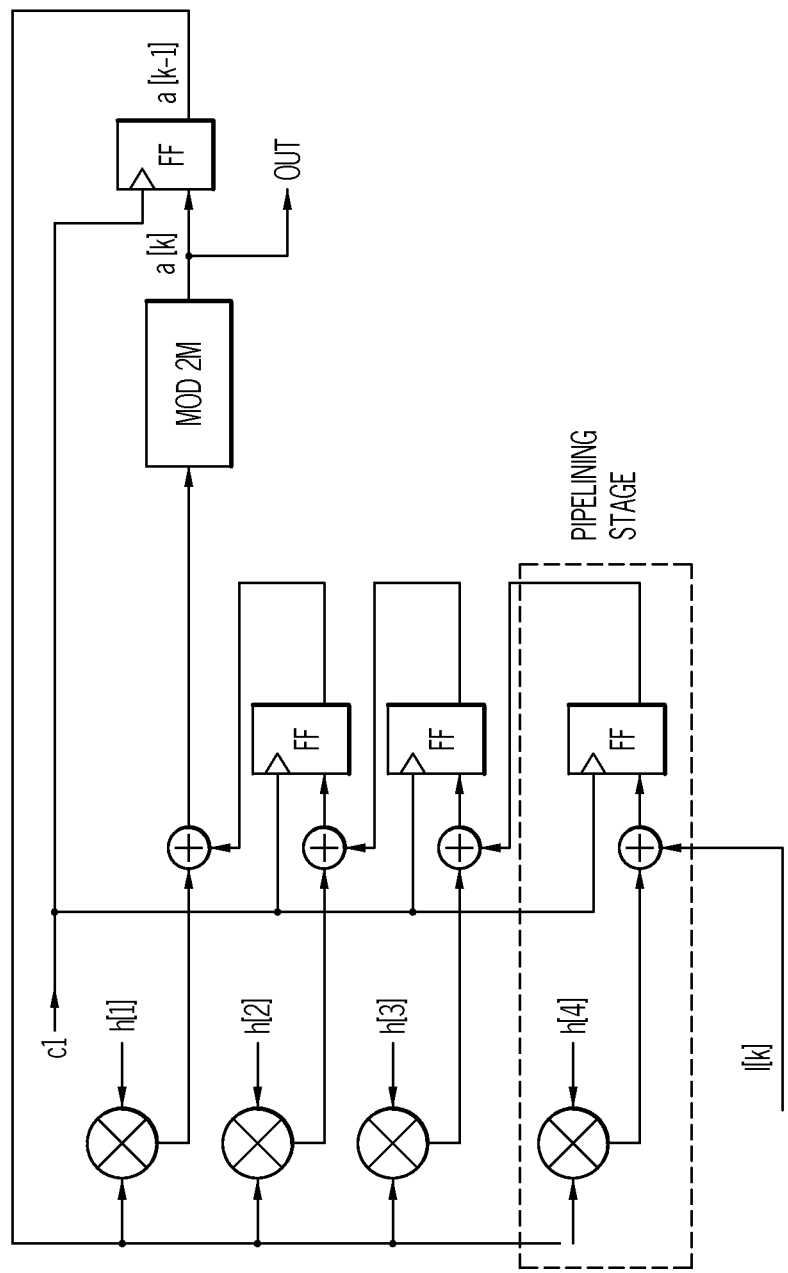
FIG. 6 illustrates a block diagram of an exemplary embodiment of another portion of the pipelining in which the pipelining stages are balanced by moving the input to the last stage.

FIG. 6 illustrates the final step of the full-rate pipelining, in which the input is moved to the end (=last tap in IIR filter) in order to balance the pipelining stages with respect to the delay and the number of components. Compared to FIG. 5, this last step increases the latency but decreases the critical path to $T_m + T_a$, which is independent of L. The modulo-operator 502 is not accounted for if the 2s-complement data format is used. The modulo-operation is implicitly contained in the truncation if an overflow or underflow occurs. An individual pipelining stage (dashed box in FIG. 6) comprises a multiplier, an adder and a delay cell. The advantages of pipelining are twofold. The critical path and hence the data rate become (ideally) independent of the number of taps ($T_m + T_a$ versus $T_m + L/2 T_a$). For large L the capacitive loading of a[k−1] introduces additional delay but this effect is still much smaller than the delay through the adder tree. Because of the limitation to only one addition per time step, the amount of arithmetic ripples (occurring in the adder tree) reduces and hence the power consumption decreases.

The architectures discussed above are operated at full-rate. Depending on the target data rate, a full-rate clock might either not be available or the timing cannot be closed within one bit period. In that case the transmitter will be operated in a sub-rate mode. The following equations describe the full-rate, half-rate and quarter-rate operation of the Tomlinson-Harashima precoding for non-return-to-zero (NRZ) signaling (N=2):

Full-Rate THP:

$$a[k] = I[k] - \left(\sum_{j=1}^{L} h_j a[k-j]\right) + b[k]2M$$

Half-Rate THP (e=even, o=odd):

$$a_e[k'] = I_e[k'] - \left(\sum_{j=1}^{L}(h_{2j-1} a_o[k'-j] + h_{2j} a_e[k'-j])\right) + b_o[k']2M \qquad (3)$$

$$a_o[k'] = \qquad (4)$$
$$I_o[k'] - \left(h_1 a_e[k'] + \sum_{j=1}^{L}(h_{2j} a_o[k'-j] + h_{2j+1} a_e[k'-j])\right) + b_o[k']2M$$

Quarter-Rate THP (L: Number of Taps):

$$a_{1q}[k''] = \qquad \text{eq. (5)-(8)}$$
$$I_{1q}[k''] - \left(\sum_{j=1}^{L}(h_{4j-3}a_{4q}[k''-j] + h_{4j-2}a_{3q}[k''-j] + h_{4j-1}\right.$$
$$\left. a_{2q}[k''-j] + h_{4j}a_{1q}[k''-j])\right) + b_{1q}[k'']2M$$

$$a_{2q}[k''] = I_{2q}[k''] - \left(\sum_{j=1}^{L}(h_{4j-3}a_{1q}[k''-j-1] + \right.$$
$$h_{4j-2}a_{4q}[k''-j] + h_{4j-1}a_{3q}[k''-j] +$$
$$\left. h_{4j}a_{2q}[k''-j])\right) + b_{2q}[k'']2M$$

$$a_{3q}[k''] = I_{3q}[k''] - \left(\sum_{j=1}^{L}(h_{4j-3}a_{2q}[k''-j-1] + \right.$$
$$h_{4j-2}a_{1q}[k''-j-1] + h_{4j-1}a_{4q}[k''-j] +$$
$$\left. h_{4j}a_{3q}[k''-j])\right) + b_{3q}[k'']2M$$

$$a_{4q}[k''] = I_{4q}[k''] - \left(\sum_{j=1}^{L}(h_{4j-3}a_{3q}[k''-j-1] + \right.$$
$$h_{4j-2}a_{2q}[k''-j-1] + h_{4j-1}a_{1q}[k''-j-1] +$$
$$\left. h_{4j}a_{4q}[k''-j])\right) + b_{4q}[k'']2M$$

Figure 7:
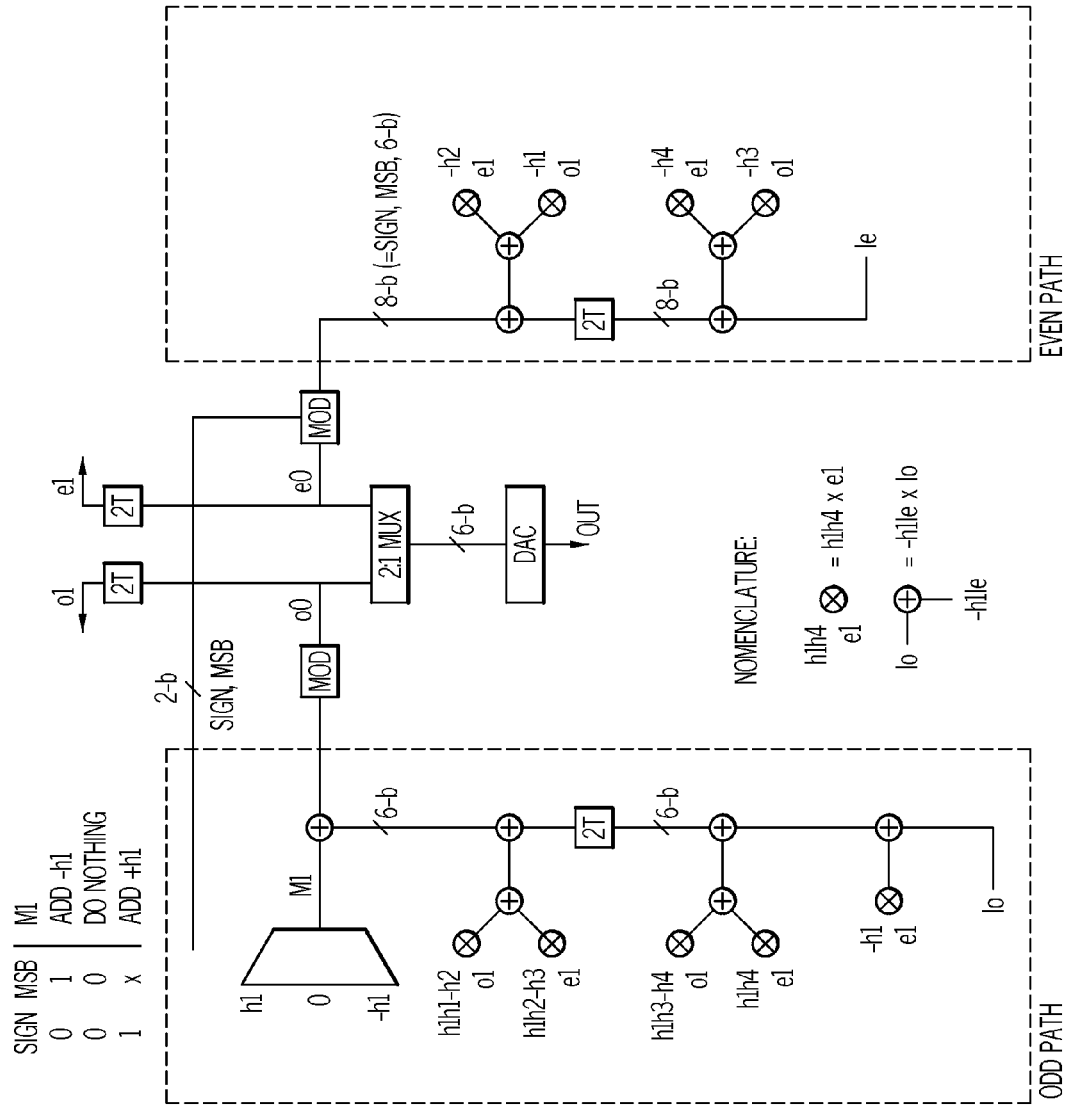
FIG. 7 illustrates a top level block diagram of an exemplary embodiment of a half-rate transmitter with the nomenclature h1-h4: post-cursor taps, $e0:=a_e[\tilde{k}]$, $e1:=a_e[\tilde{k}-1]$, $Ie:=Ie[\tilde{k}]$.

For a sub-rate example we first consider the half-rate operation of a 4-tap THP equalizer, which can be derived from (1) as follows:

$$a_e[\tilde{k}] = I_e[\tilde{k}] - (h_1 a_o[\tilde{k}-1] + h_2 a_e[\tilde{k}-1] + h_3 a_o[\tilde{k}-2] + h_4 a_e[\tilde{k}-2]) + b_{k,e}2M, \qquad (9)$$

$$a_o[\tilde{k}] = I_o[\tilde{k}] - (h_1 a_e[\tilde{k}] + h_2 a_o[\tilde{k}-1] + h_3 a_e[\tilde{k}-1] + h_4 a_o[\tilde{k}-2]) + b_{k,o}2M, \qquad (10)$$

where $\tilde{k}=2k$. Because $a_e[\tilde{k}]$ occurs in (10), the calculation of $a_o[\tilde{k}]$ may not benefit from the time step doubling in the half-rate operation. To eliminate this dependency, (9) can be substituted for $a_e[\tilde{k}]$ into (10). However, this leads to a new term $-h_1 b_{k,e}2M$ in $a_o[\tilde{k}]$. Compared to the original dependency in (10), the calculation of $-h_1 b_{k,e}2M$ can be performed much faster. Furthermore the problem simplifies if $$\sum_{j=1}^{N}|h_j| < 2M$$

and the normalization 2M=1 are applied. For these conditions—which might apply to typical memory channels—it is sufficient to detect an over-/underflow in $a_e[\tilde{k}]$ and subtract/add $h_1$ from/to $a_o[\tilde{k}]$ because $b_{k,e}2M$ (abbreviated below with M1) can then only assume the values −1, 0 or +1. The over-/underflow detection is obtained by extending $a_e$ k with two additional bits (1 sign bit, 1 MSB). The block diagram of a pipelined, half-rate THP with 4 taps is shown in FIG. 7. Note that the odd path has 6 bit resolution whereas the even path has 8 bit resolution and the truth table indicates how the two extra bits are processed to perform the M1 modulo operation.

Figure 8A:
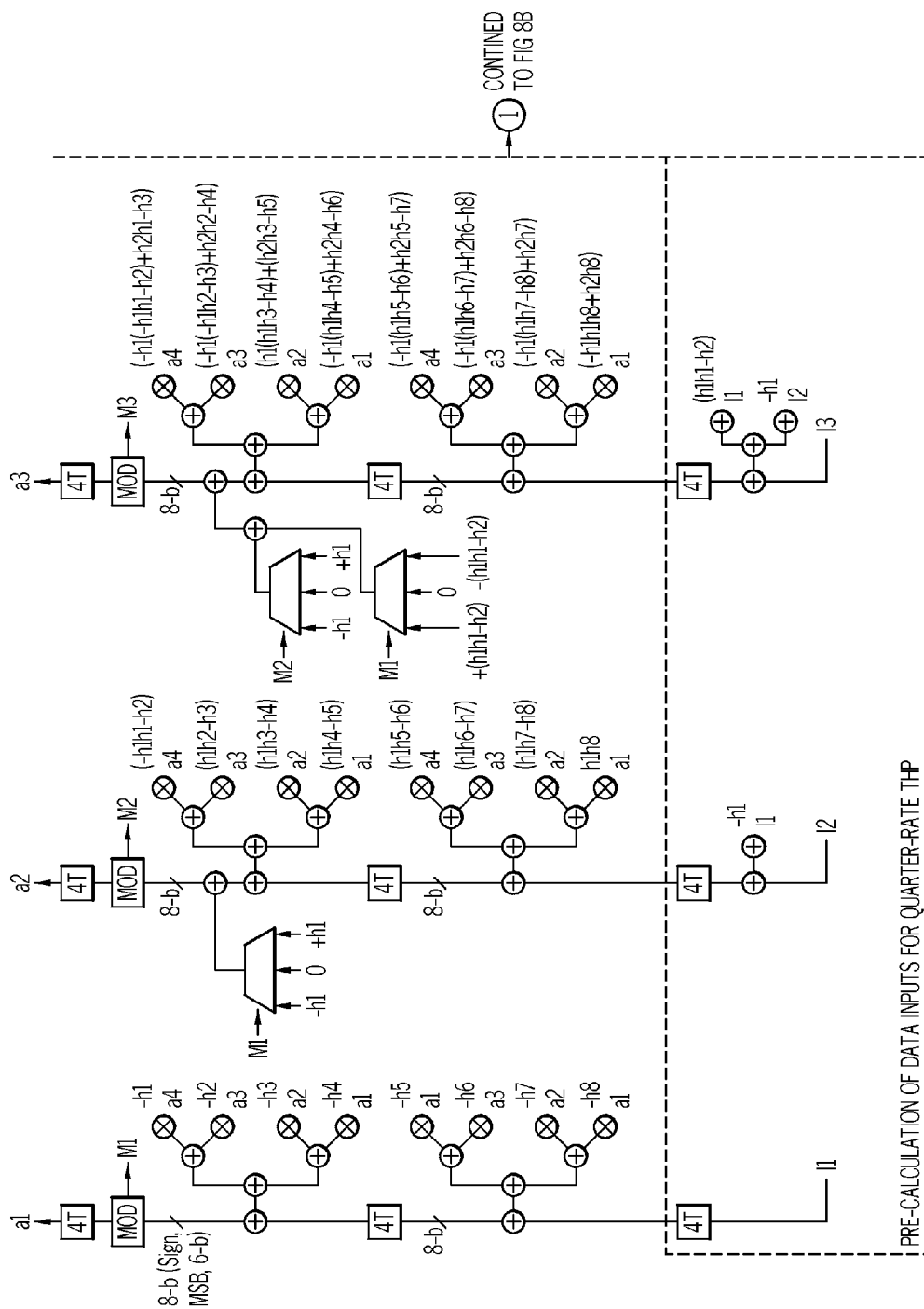
FIGS. 8A-B illustrate a top level block diagram of an exemplary embodiment of a pipelined, quarter-rate THP with 8 taps and pre-computation of input data. Nomenclature of quarter-rate symbols: $a1:=a1[k'-1], \ldots, a4=a4[k'-1]$, $I1=I1[k'], \ldots, I4=I4[k']$ with $k'=4k$.
Figure 8B:
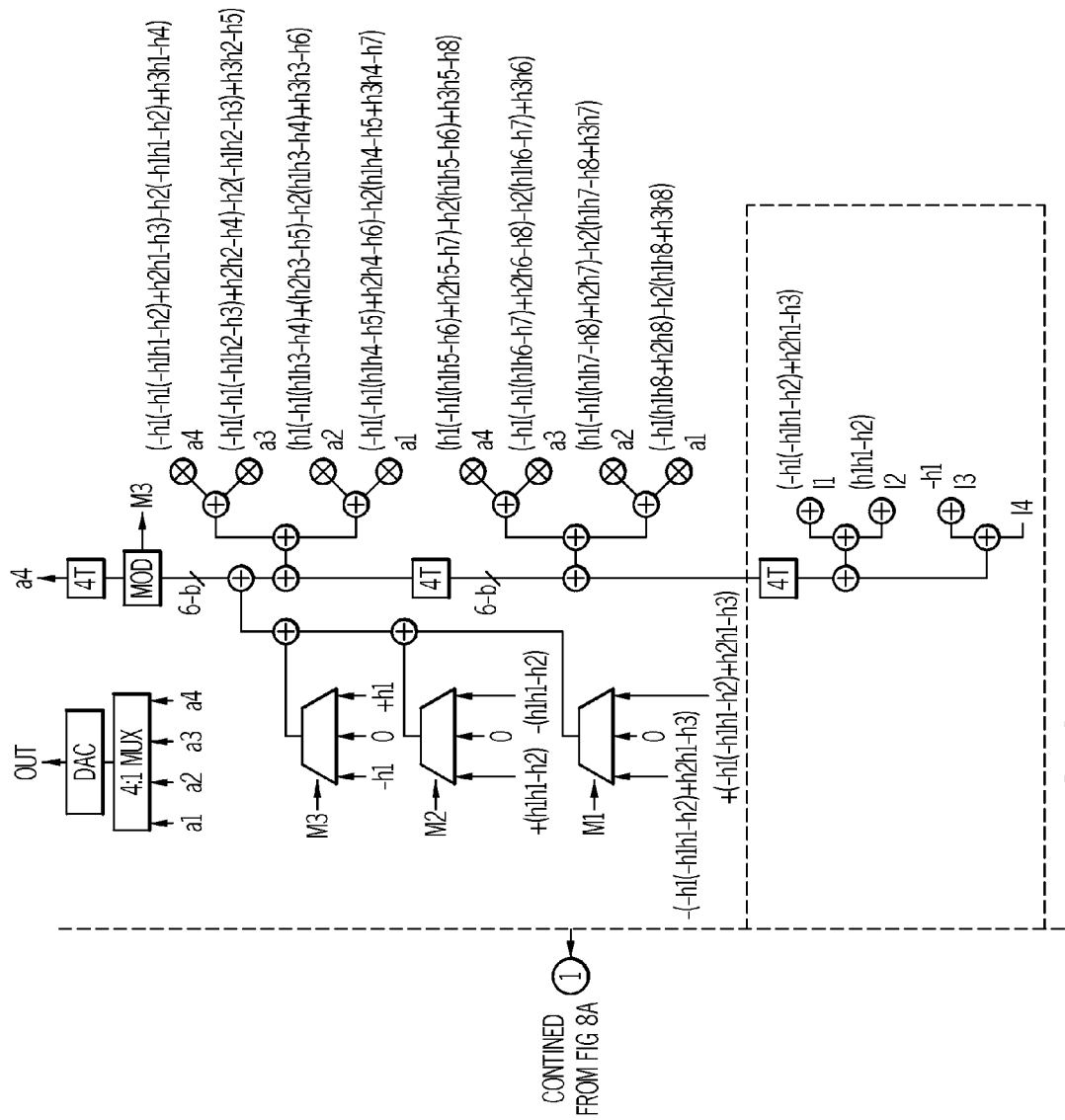

An even further sub-rate scaling increases the speed. An example of a quarter-rate THP is shown in FIGS. 8A-B. Compared to FIG. 7 where the critical path consists of $T_m + 3T_a + T_d$ over a time period of 2 unit intervals (UI), the quarter-rate THP has $T_m + 6T_a + 3T_d$ over 4 UIs and hence the delay saving is $T_m - T_d$ ($T_d$=delay of modulo decision) with respect to the half-rate period.

The calculation of the coefficient factors (e.g. h1h2−h3) in FIG. 8A-B is based on the same principle as the coefficient calculation in the half-rate example given above. The quarter-rate equations (5) through (8) are first written down for the number of taps required (e.g. L=8). Afterwards the mutual dependencies are eliminated by first inserting a1q into a2q, then inserting the updated a2q into a3q and finally the updated a3q into a4q. Next the updated a1q through a4q, which now only have mutual dependencies via the modulo operators M1 through M3, are rearranged according to the pipelining principle outlined in FIG. 4 through 6 in order to adapt to the pipelining architecture shown in FIG. 8A-B. Similar to the half-rate example shown above, the modulo operators M1 through M3 can take the values −1, 0 or +1, which are then used as selector signals (see FIG. 8A-B) for the muxes that add the pertinent coefficients to a1 through a4. For instance in the a2-path, M1 selects either −h1, 0 or +h1 according to the following truth table (cf. left corner in FIG. 7):

| M1 | selected summand |
| --- | --- |
| −1 | +h1 |
| 0 | 0 |
| +1 | −h1 |

The value of M1 is obtained according to the following truth table:

| a1 | M1 |
| --- | --- |
| underflow (=positive modulo jump) | −1 |
| within range (=no modulo jump) | 0 |
| overflow (=negative modulo jump) | +1 |

A similar principle of operation applies to the remaining modulo operators M2 and M3.

A further modification in FIG. 8A-B is the pre-calculation of the input data, which saves two extra additions (at the cost of increased latency). The pre-calculation performs all multiplications and additions that are directly related to any of the inputs I1 through I4 in the clock cycle prior to the handover of the results to the main feedback loop. The pre-calculation is indicated in FIG. 8A-B by the delay units 4T (in the half-rate case it is 2T) that separate the pre-calculated results from the successive main loop of the quarter-rate IIR filter. Note that the subtraction of the post-cursor ISI from the inputs I1 through I4 is indirectly performed by the inversion of the tap coefficients. This is in contrast to FIG. 3 where the subtraction is explicitly carried out as indicated by the negative sign at the final summer. As will be shown below it is in principle possible to feed the pre-calculated results to any other than the last pipelining stage. This would give a penalty of one extra adder delay—since only the last stage has one adder less than the other pipelining stages—but on the other hand the latency gets decreased.

Figure 9:
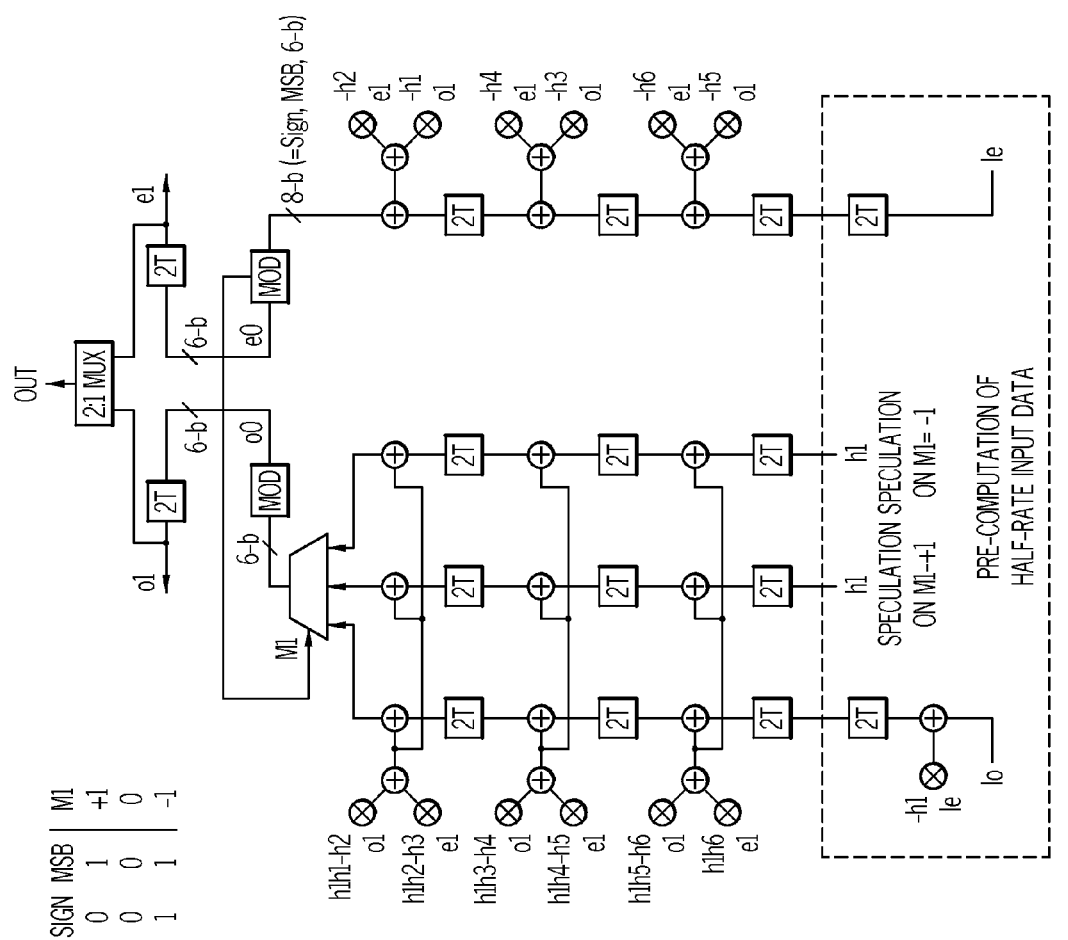
FIG. 9 illustrates a top level block diagram of an exemplary embodiment in which modulo speculation is applied via duplication of odd data path.

A further reduction of loop delay can be performed by modulo speculation. FIG. 9 shows a half-rate THP with M1 modulo speculation. The speculation paths eliminate completely the delay of the modulo addition (cf. FIG. 7), if they are started already at the pre-calculation stage or the last pipelining stage if no pre-calculation is used. This, however, would require the duplication of the whole odd delay cell chain for each speculation path, which results in a power penalty if the number of taps becomes big. As a compromise—shown in FIG. 10—the speculation paths are shortened by taking their inputs from the very beginning of the odd path. This does not reduce the critical path but allows the pre-computed input data to be moved closer to the top, which reduces latency.

Figure 10:
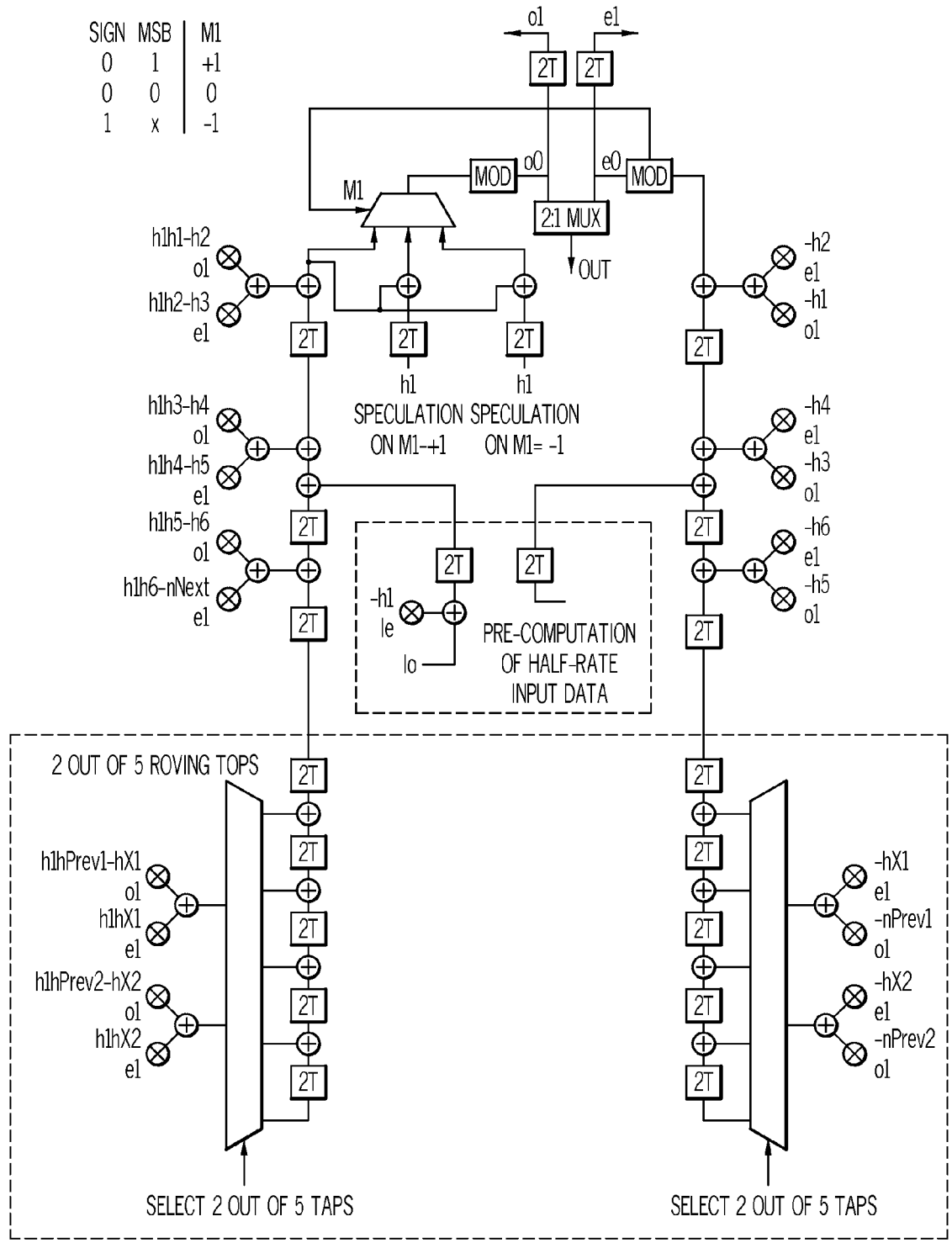
FIG. 10 illustrates a top level block diagram of an exemplary embodiment with reduced speculation path to decrease the latency.

FIG. 10 also shows how roving taps can be added to this pipelined architecture. One might prefer to apply roving taps only to those tap positions in the pulse response that have a significant impact on the ISI calculation in the IIR filter. A roving tap basically includes a regular pipelining stage (cf. FIG. 6) that can be switched via a selector to a specific delay position in a delay line.

The THP per se only cancels post-cursor intersymbol interference (ISI). If the channel requires pre-cursor equalization, the extension of FIG. 11A-B (see dashed box at the top) can be applied. It is a pipelined, half-rate feed-forward equalizer (FFE) with 4 taps to cancel pre-cursor ISI. The FFE topology displayed can be derived by applying the following half-rate FFE equations to the pipelining approach outlined in FIG. 4 through FIG. 6:

$$q_e[\tilde{k}] = h_0 e[\tilde{k}] - p_1 o[\tilde{k}+1] - p_2 e[\tilde{k}+1] - p_3 o[\tilde{k}+2] - p_4 e[\tilde{k}+2] \quad (11)$$

$$q_o[\tilde{k}] = h_0 o[\tilde{k}] - p_1 e[\tilde{k}+1] - p_2 o[\tilde{k}+1] - p_3 e[\tilde{k}+2] - p_4 o[\tilde{k}+2] \quad (12)$$

Each of the FFE half-rate outputs $q_e$ and $q_o$ are followed by a scaling operator to limit the launch level. It can be implemented either by a bit shift or an explicit multiplication with a scaling factor.

Figure 11A:
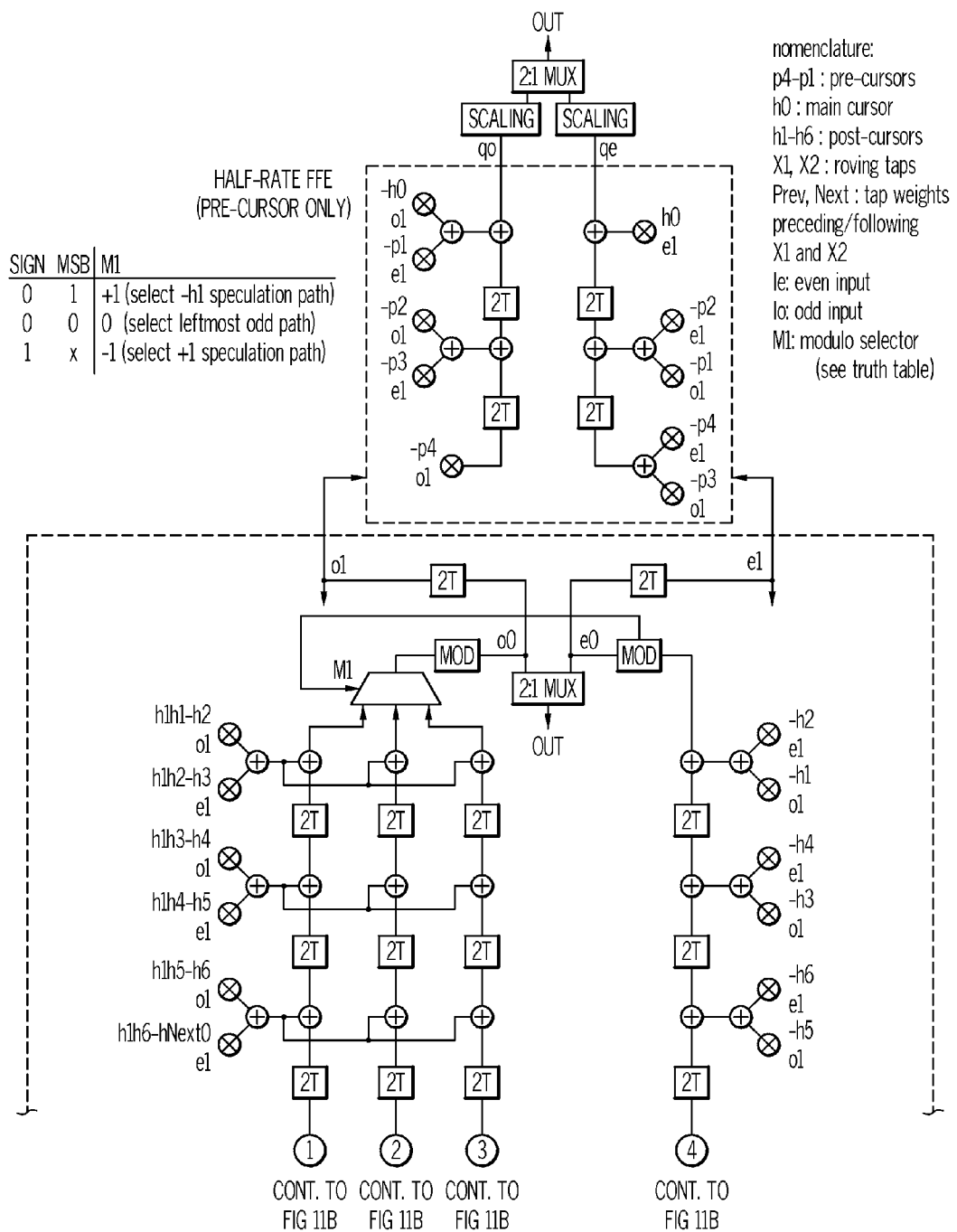
FIG. 11A-B illustrate a top level block diagram of an exemplary embodiment of a pipelined, half-rate THP with 6 fixed taps (h1-h6) and 2 roving taps (X1, X2), modulo speculation (M1), pre-computation of input data and pre-cursor FFE (p1-p4).
Figure 11B:
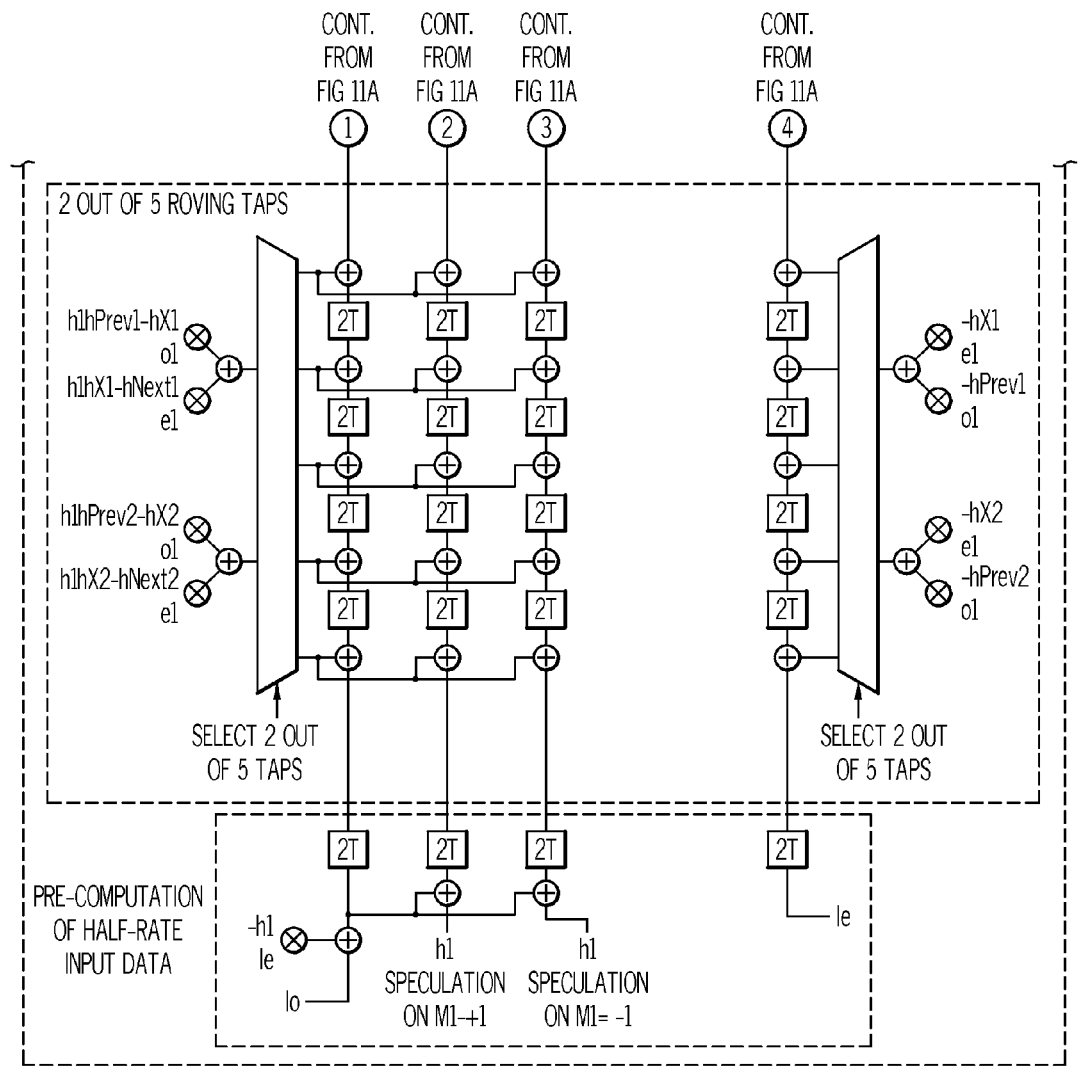
Figure 12A:
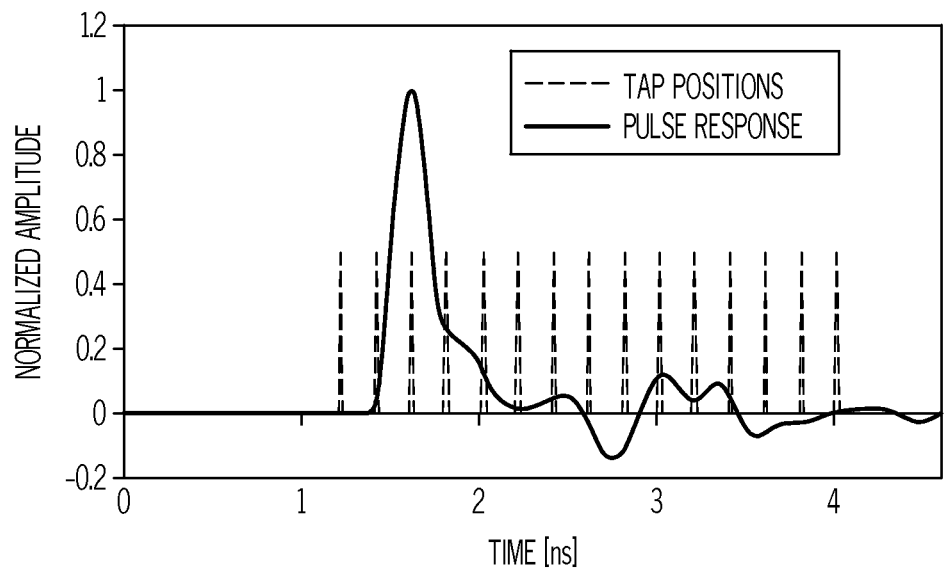
FIG. 12A illustrates a graph of the pulse response of a 2-dimm/2-rank memory channel with PRBS7 NRZ and PAM-4 signalling using an 8 tap, 6 bit THP.
Figure 12B:
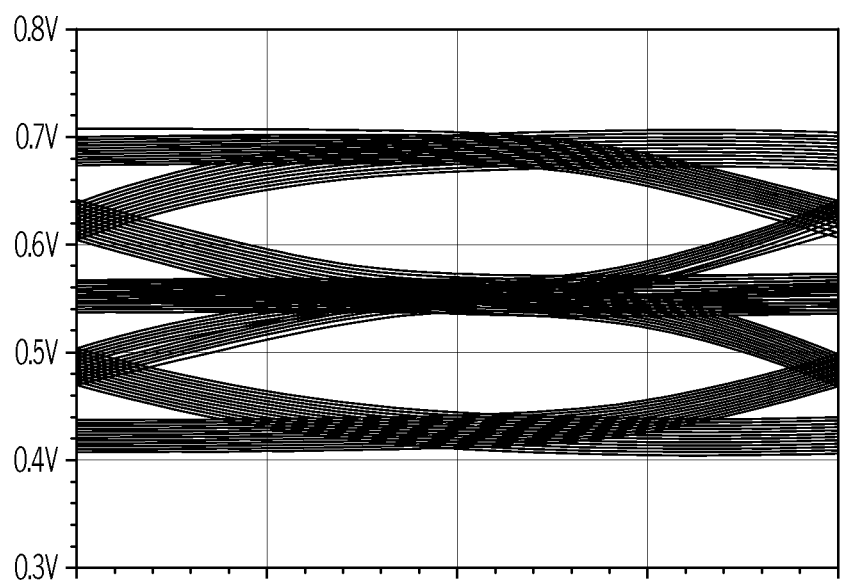
FIGS. 12B-D illustrate eye diagrams of a 2-dimm/2-rank memory channel with PRBS7 NRZ and PAM-4 signalling using an 8 tap, 6 bit THP.
Figure 12C:
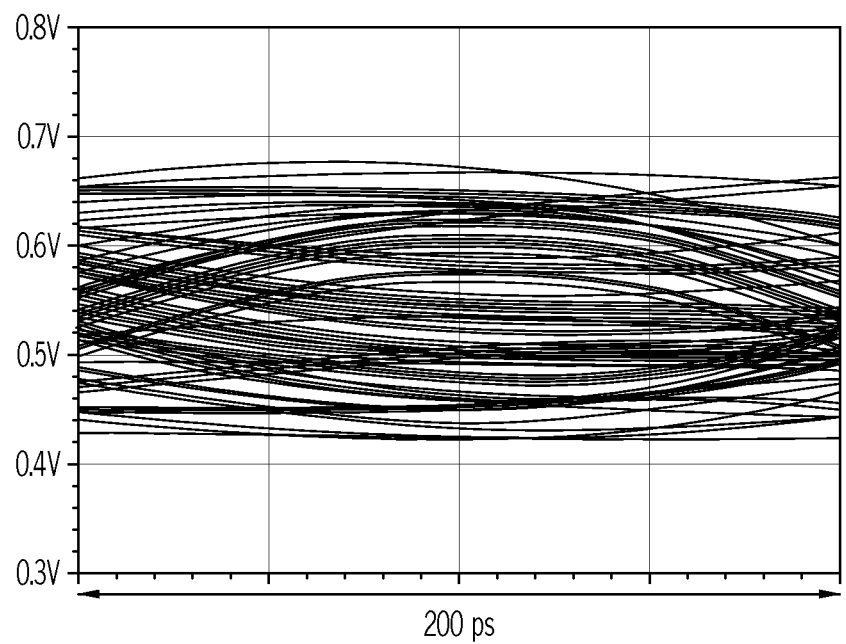
Figure 12D:
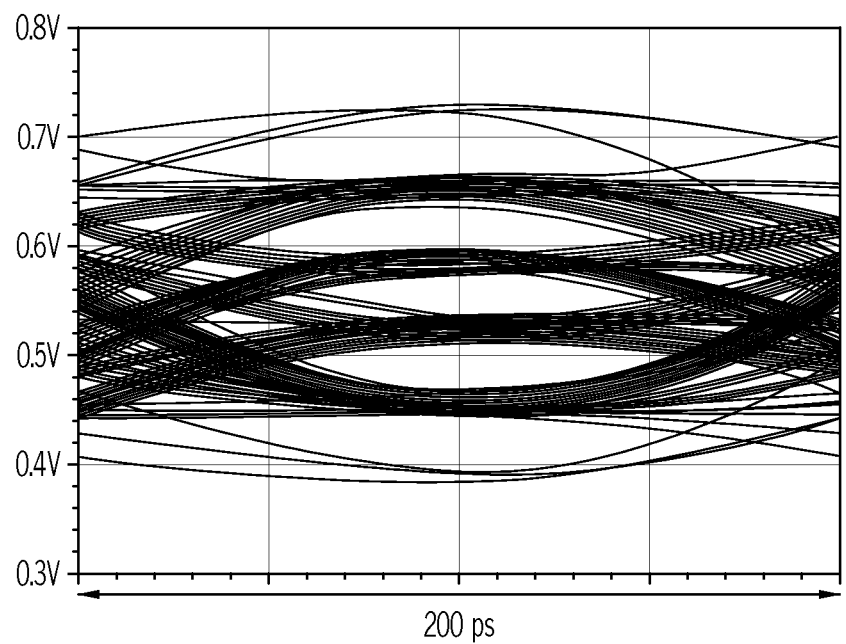

The FFE depicted in FIG. 11A-B is not only limited to pre-cursor taps. Depending on the channel characteristic, it might consist of pre- and post-cursor taps. The FFE tap weights can be determined according to the following procedure: Calculate the THP pulse response by applying a pulse of one UI to the IIR filter; calculate the convolution between the THP pulse response and the memory channel. This takes the influence of the THP on the pre-cursor ISI into account; apply a least mean square or zero forcing method to the previously calculated convolution to determine the FFE coefficients in order to eliminate the pre-cursor ISI.

Figure 13:
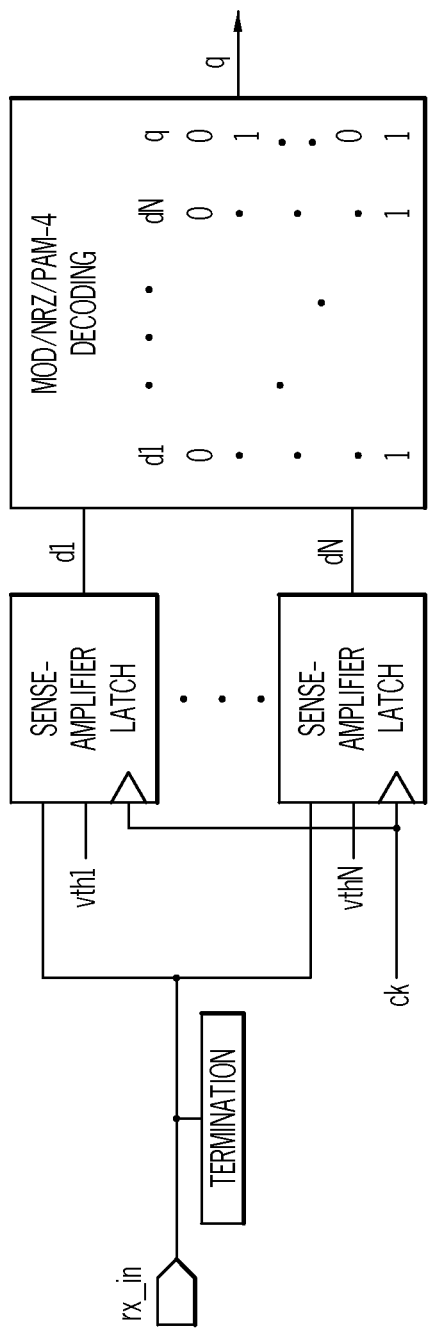
FIG. 13 illustrates a block diagram of a THP receiver for NRZ and PAM-4 signalling. The decision levels vth1 through vthN are chosen according to modulo levels, the signalling format and the channel attenuation.

Exemplary NRZ and PAM-4 eye diagrams transmitted over a 2-dimm/2-rank memory channel are shown in FIGS. 12A-D. Compared to the original data patterns, the eye diagrams contain additional amplitude levels stemming from the modulo jumps. As shown in FIG. 13 the demodulation can be performed with a bank of sense-amplifier latches, each having a different decision level. These data slicers are followed by combinatorial logic to fold back the detected amplitude levels to a binary data pattern.

Figure 14:
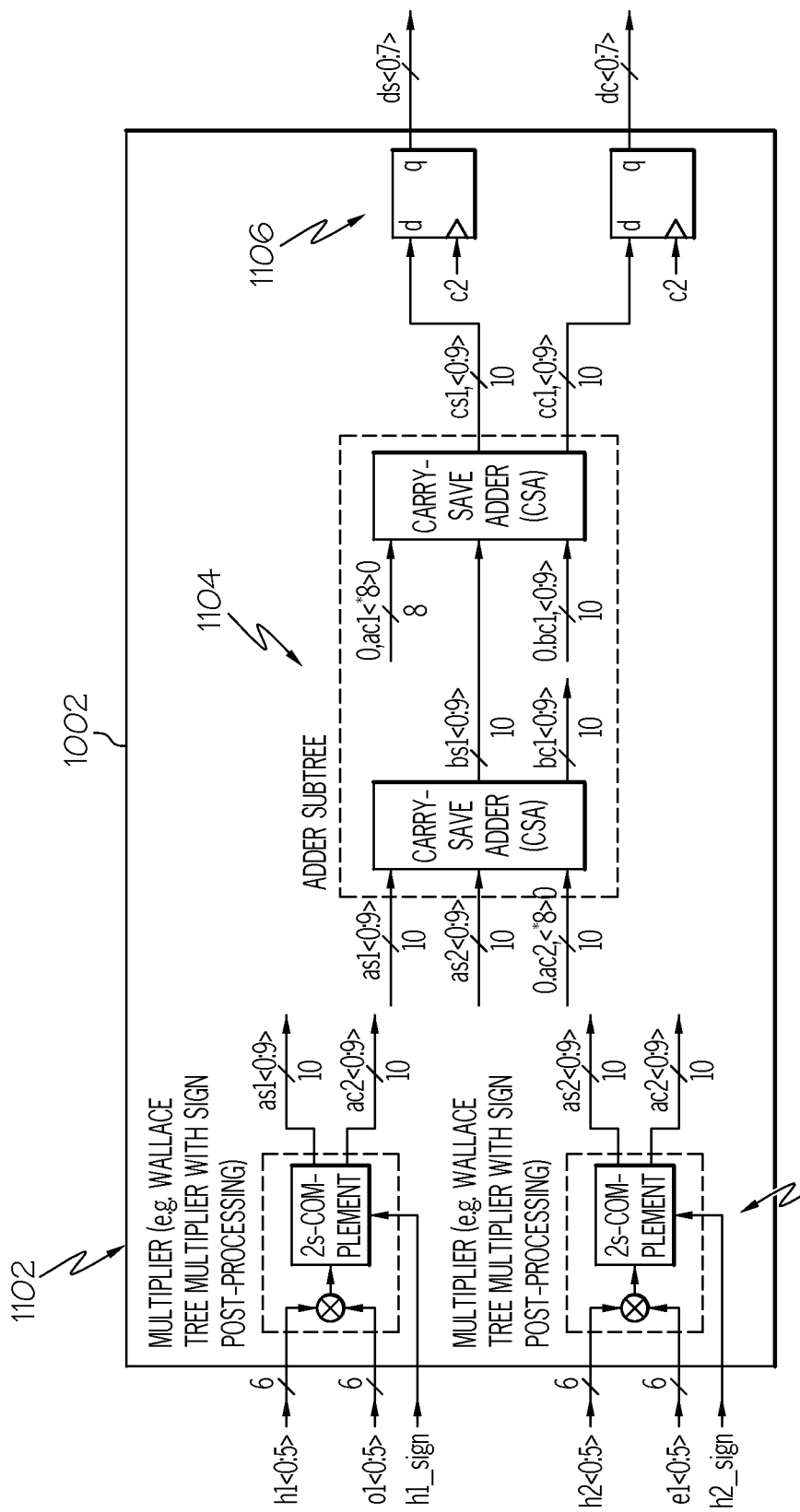
FIG. 14 illustrates a block diagram of an exemplary embodiment of a pipelining stage of FIG. 10.

FIG. 14 illustrates a block diagram of an exemplary embodiment of a pipelining stage 1002 that includes multiplier portions 1102, an adder subtree portion 1104, and a flip flop portion 1106 similar to the pipelining stages described above.

Figure 15:
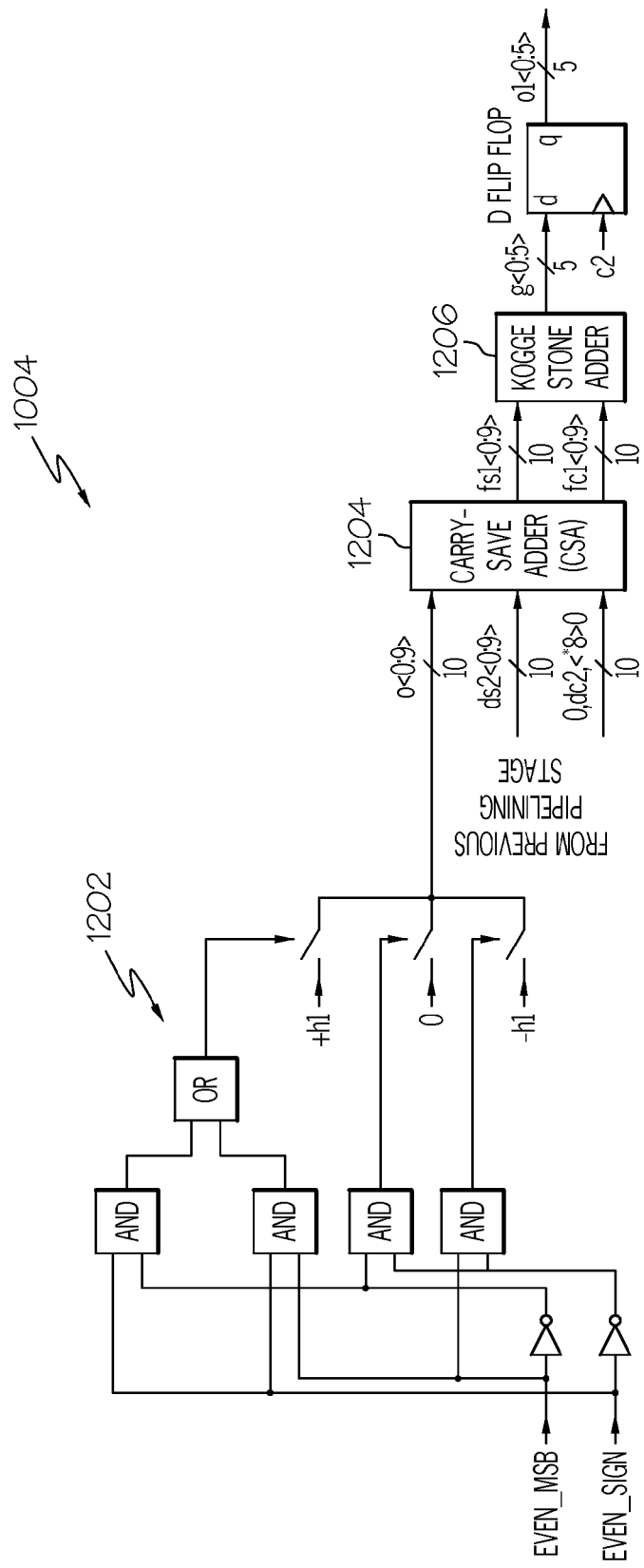
FIG. 15 illustrates a block diagram of an exemplary embodiment of the even modulo detector portion of FIG. 10.

FIG. 15 illustrates a block diagram of an exemplary embodiment of the even modulo detector portion 1004. The even modulo detector portion 1004 includes a carry save adder portion 1204 that receives signals from a logic portion 1202 and outputs signals to a Kogge Stone adder portion 1206 that outputs signals to a D flip-flop 1208. The odd modulo detector portion 1005 is similar to the even modulo detector portion 1004, however the logic portion (not shown) of the odd modulo detector portion 1005 is arranged to logically process odd signals.

Figure 16:
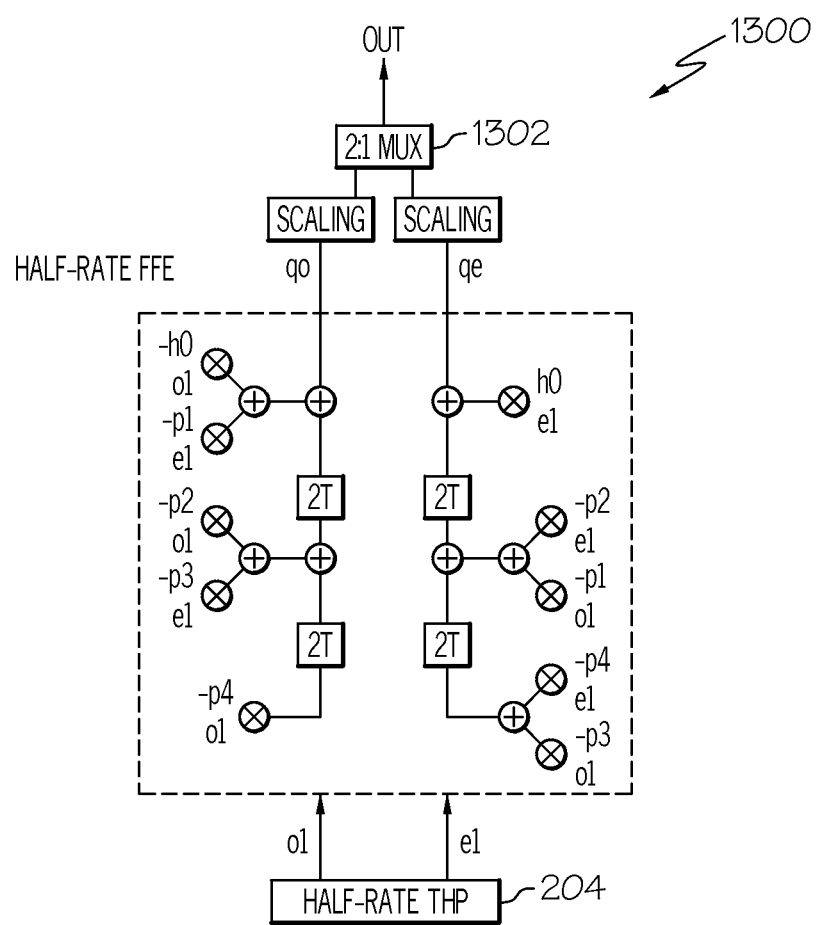
FIG. 16 illustrates a block diagram of a half-rate pre-cursor FFE portion of FIG. 11A-B.

FIG. 16 illustrates a block diagram of a half-rate pre-cursor FFE portion 1300. The half-rate pre-cursor FFE portion 1300 receives the e1 and o1 signals from the pipelined half-rate THP transmitter arrangement 204 (of FIG. 10) and outputs scaled signals to a multiplexor 1302. The signals output from the multiplexor 1302 are output to the memory chip 206 (of FIG. 1). In this regard, serial link feed-forward equalization (FFE) reduces pre-cursor intersymbol interference (ISI).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A system comprising:
   a memory hub chip including a Tomlinson-Harashima precoding (THP) equalizer portion operative to perform transmitter equalization at the memory hub chip and send data to a memory chip, wherein the THP equalizer portion comprises a modulo speculation portion operative to receive an input from a beginning of an even feedback path, the THP equalizer portion operative to detect a modulo jump in the even path and responsive to detecting a modulo jump in the even path, perform an addition or subtraction of a summand in an odd feedback path.

2. The system of claim 1, wherein the even feedback path is connected to taps of even delay lines of the even feedback path.

3. The system of claim 2, wherein the THP equalizer portion is operative to simultaneously multiply signals received from the taps of the even delay lines with memory channel coefficients and sequentially sum the multiplied signals.

4. The system of claim 1, wherein the odd feedback path is connected to taps of odd delay lines of the odd feedback path.

5. The system of claim 4, wherein the THP equalizer portion is operative to simultaneously multiply signals received from the taps of the odd delay lines with memory channel coefficients and sequentially sum the multiplied signals.

6. The system of claim 1, wherein the THP equalizer portion comprises a modulo speculation portion operative to receive an input from a beginning portion of the odd feedback path.

7. The system of claim 1, wherein the THP equalizer portion includes a data pre-computation portion operative to receive even data and output the even data to the even feedback path.

8. The system of claim 1, wherein the memory chip comprises a dual inline memory module memory.

\* \* \* \* \*